(12) United States Patent
Yellin et al.

(10) Patent No.: US 11,892,977 B2
(45) Date of Patent: Feb. 6, 2024

(54) STORED ENTITY METADATA RE-BALANCING UPON STORAGE EXPANSION

(71) Applicant: VAST DATA LTD., Tel Aviv (IL)

(72) Inventors: Ido Yellin, Tel Aviv (IL); Avi Goren, Tel Aviv (IL); Oded Sonin, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 72 days.

(21) Appl. No.: 17/450,994

(22) Filed: Oct. 14, 2021

(65) Prior Publication Data
US 2023/0117571 A1    Apr. 20, 2023

(51) Int. Cl.
*G06F 16/16*    (2019.01)
(52) U.S. Cl.
CPC .................................. *G06F 16/164* (2019.01)
(58) Field of Classification Search
CPC ..................................................... G06F 16/164
See application file for complete search history.

(56) References Cited

U.S. PATENT DOCUMENTS

| | | | |
|---|---|---|---|
| 6,418,438 B1 | 7/2002 | Campbell | |
| 9,262,463 B2 | 2/2016 | Helak et al. | |
| 10,055,300 B2 | 8/2018 | Zhang et al. | |
| 10,089,316 B1* | 10/2018 | Haase | G06F 16/1727 |
| 2011/0307659 A1* | 12/2011 | Hans | H03M 7/3084 711/E12.001 |
| 2011/0320399 A1* | 12/2011 | Ledwich | G06Q 10/06 707/602 |
| 2019/0146926 A1 | 5/2019 | Lee et al. | |
| 2019/0235782 A1 | 8/2019 | Yu et al. | |
| 2019/0266026 A1* | 8/2019 | Halim | G06F 9/5077 |
| 2020/0293532 A1 | 9/2020 | Uzar et al. | |
| 2022/0197830 A1 | 6/2022 | Steinke | |

* cited by examiner

*Primary Examiner* — Hosain T Alam
*Assistant Examiner* — Anthony G Gemignani
(74) *Attorney, Agent, or Firm* — Reches Patents

(57) ABSTRACT

A method that includes instructing multiple compute entities, by an expansion manager and during a first phase of the stored entity metadata re-balancing, to: lookup any stored entity metadata by using: (a) a current translation function for linking identifiers of stored entities to stored entities metadata; wherein the current translation function is based on a size of a current storage space allocated to stored entities metadata; and (b) a next translation function for linking identifiers of stored entities to stored entities metadata; wherein the next translation function is based on a size of a next storage space allocated to stored entities metadata; wherein the current space is expanded during the expansion of the storage system to provide the next storage space, and to update any stored entity metadata accessed using the current translation function without updating stored entity metadata accessed using the next translation function.

18 Claims, 9 Drawing Sheets

STORED ENTITY METADATA RE-BALANCING UPON STORAGE EXPANSION

TECHNICAL FIELD

The present disclosure generally relates to the field of data storage, and more particularly to stored entity metadata re-balancing upon storage expansion.

BACKGROUND

Scalability has become one of the most valuable measures of storage systems, providing the ability to increase the performance and adapting the cost in response to growing demands.

Scale-out storage is an expandable storage architecture that allows expanding the total amount of disk space by connecting additional storage nodes to the shared network, for extending the storage resources, when the storage limits are reached or when improved performance is required.

There is a need to take advantage of the added storage resources for re-balancing the metadata of the storage system across newly added storage nodes with minimal interruption to the ongoing storage processes.

SUMMARY

There may be provide a storage system, a method and a non-transitory computer readable medium for metadata re-balancing upon storage expansion.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
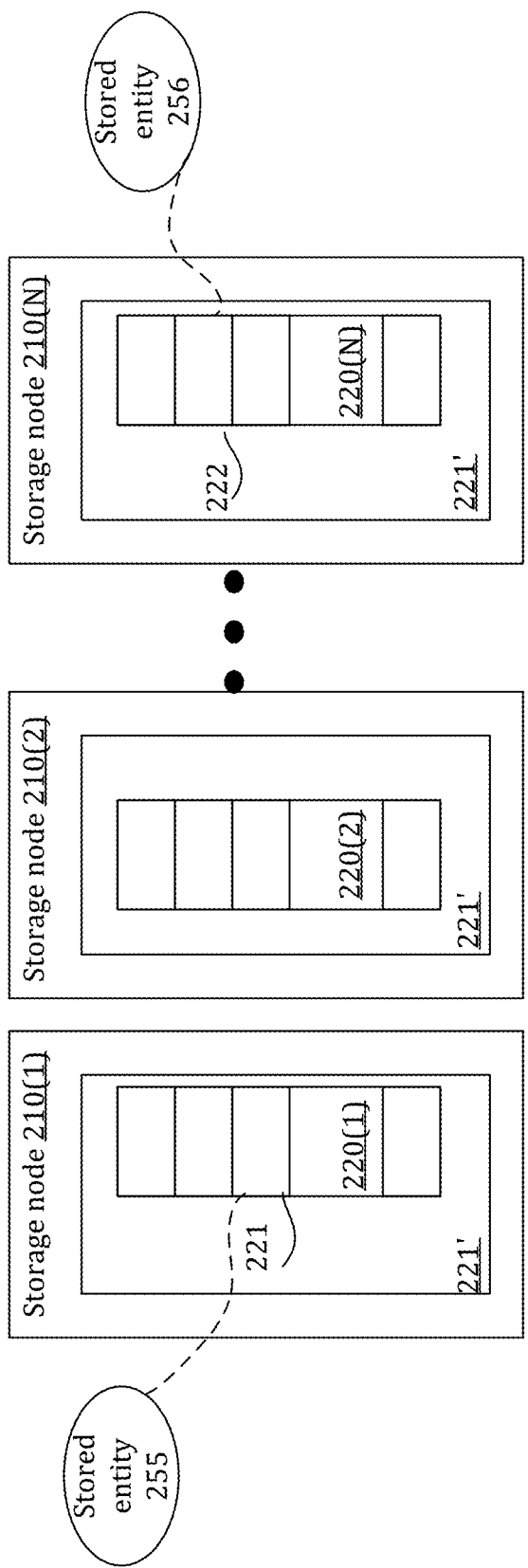
FIG. 1 illustrates an example of storage nodes of a storage system before an expansion process.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

There may be provided a storage system, a method and a non-transitory computer readable for metadata re-balancing upon storage expansion.

Adding storage space to a scale-out storage system is carried out while the storage system is running and continues to provide storage services. Embodiments of the present invention utilize an expansion process (addition of storage resources by adding storage nodes) to allow re-balancing of metadata structures that are stored in the current set of storage devices, so that the metadata can be expanded across the entire space provided by the storage space addition and the current storage space.

The storage system includes multiple compute nodes that all together include multitude compute resources, where the compute nodes are coupled to multiple storage nodes. The term compute entities may refer to compute nodes or compute resources of the compute nodes, such as CPUs (central processing units), microcontrollers, etc.

The addition of storage resources provides a broader address space and particularly, a broader metadata storage space, which is the storage space allocated to metadata.

The expansion process may be performed by the compute entities that all need to be synchronized to the transition to the broader metadata storage space. The compute entities should continue servicing access requests and other storage operations, during the ongoing expansion process, without interruption or substantial performance degrade.

Various metadata structures are sharded across storage nodes and storage devices. Such metadata structures may be stored in fast accessed storage devices or memory, such as RAM (Random Access Memory) and NVRAM (Non-Volatile RAM), or other storage devices, that are part of various storage nodes of the storage system.

Mapping of stored entities into their associated metadata entries within the metadata structures that are sharded across multitude storage resources, is done without needing to use mapping structures, but rather using translation functions that are based on stored entity identifiers and the size of the metadata storage space. The size of the metadata storage space and the translation functions may be based on the number of storage nodes, the amount of storage (e.g., number of blocks/sections) allocated to metadata in each memory device or in each storage node, and the like.

For example, a locking mechanism may deploy a lock metadata structure, that includes lock information for each stored entity whose access requires synchronizing multiple potential accessing entities, by using the lock mechanism. The lock metadata structure includes multiple lock entries that may be spread across the storage nodes. Each lock entry may include lock information for one or more stored entities. The lock information entry may include one or more of: lock state, lock type, lock counter, stored entity that currently utilizes the lock, etc.

The stored entity that requires protection by a lock mechanism may be a data block identified by the block address, a file identified by a file identifier (e.g., a file handle). Memory devices may include dedicated sections for storing locks. The function that calculates the location (storage node, memory section, and offset within the memory section) of a lock entry of a specific stored entity, is based on the stored entity identifier, and further based on at least one of: the number of storage nodes, the amount of memory allocated to lock metadata, etc. The function may use, for example, a modulo operation or a hash function.

Since the location of metadata entries (e.g., a lock entry) is depended on the size of the metadata storage space, the translation function results are changed upon expansion and the location of the metadata entries are changed when expanding the storage space of the system.

The following embodiments can be implemented for synchronizing all the compute entities of the storage system to the changed locations of various metadata entries, while continuing using these metadata entries during the expansion process for ongoing storage operations.

The metadata re-balance during the expansion is done in phases, so as to synchronize all the compute entities to the new metadata addressing scheme. The metadata re-balance refers to the change in the locations of metadata entries, so as to exploit the metadata storage space of the new added storage devices.

The following example described a metadata re-balance associated with lock structure expansion. The expansion process is being managed by an expansion manager, which may be a module in one of the compute nodes. Since there may be a multitude number of compute entities that need to adapt to the new addressing rules of the lock metadata, the process is handled in multiple phases, so as to avoid intermediate potential conflict states of unsynchronized compute entities addressing according to different addressing schemes.

There may be provided an expansion manager that may be implemented in hardware and/or executed by hardware and/or be stored in a non-transitory computer readable medium and/or may be software, of firmware. The expansion manager may be one or more compute nodes, may be a module included in one or more compute nodes, may be one or more compute cores, may be included in one or more compute cores, and the like.

Following the beginning of the expansion process, a first phase of the lock structure expansion includes sending, by the expansion manager, a first instruction to all the computing entities, to start acquiring new locks, when needed, according to both the old address scheme (using the function with the old storage capacity allocated to lock-structures) and the new address scheme (using the function with the new storage capacity allocated to lock-structures).

The first phase continues until all the compute entities receive the first instruction and acknowledge the reception of the instruction. During the first phase, the compute entities that received the first instruction, start to acquire new locks by updating both: (i) the old lock entry, that corresponds to the stored entity to be locked and the calculated lock entry when using the old lock metadata storage space, (ii) the new lock entry that corresponds to the stored entity to be locked and the calculated lock entry when using the new lock metadata storage space.

By updating the old lock entry as well as the new lock entry, compute entities that have not yet received the first instruction can continue to check the old lock entries when needing to lock and still obtain a current state of the lock, as the old locations are still being updated by all compute nodes.

In order to prevent deadlocks, when acquiring 2 locks that refer to the same stored entity (according to old and new schemes), the compute entity will lock them in an order, according to their addresses, for example, lower address is locked first.

The first phase is completed when all the compute entities received the first instruction and acting accordingly.

The second phase starts by sending, to all the compute entities, a second instruction to start acquiring locks, when needed, according to the new address scheme only, and start checking lock states according to both the old address scheme and the new address scheme. Checking for a lock state in the old lock entry in addition to the new lock entry—is essential, so that locks acquired prior to the second phase and have not been released yet, would not be ignored.

During the second phase, the existence of locks that are still active according to the old lock space scheme is monitored. This can be done by the expansion manager that monitors the locks, or may be determined when all the compute entities report to the expansion manager that any old lock that was taken by them—is released.

The second phase is completed when all the compute entities received the second instruction and acting accordingly or when all the locks according to the old address scheme are released, the longest between the two.

The third phase of the lock expansion includes sending a third instruction to all the computing entities to use only the new lock scheme from now on. The third phase is ended when all the compute entities received the third instruction and start to act accordingly.

Figure 2:
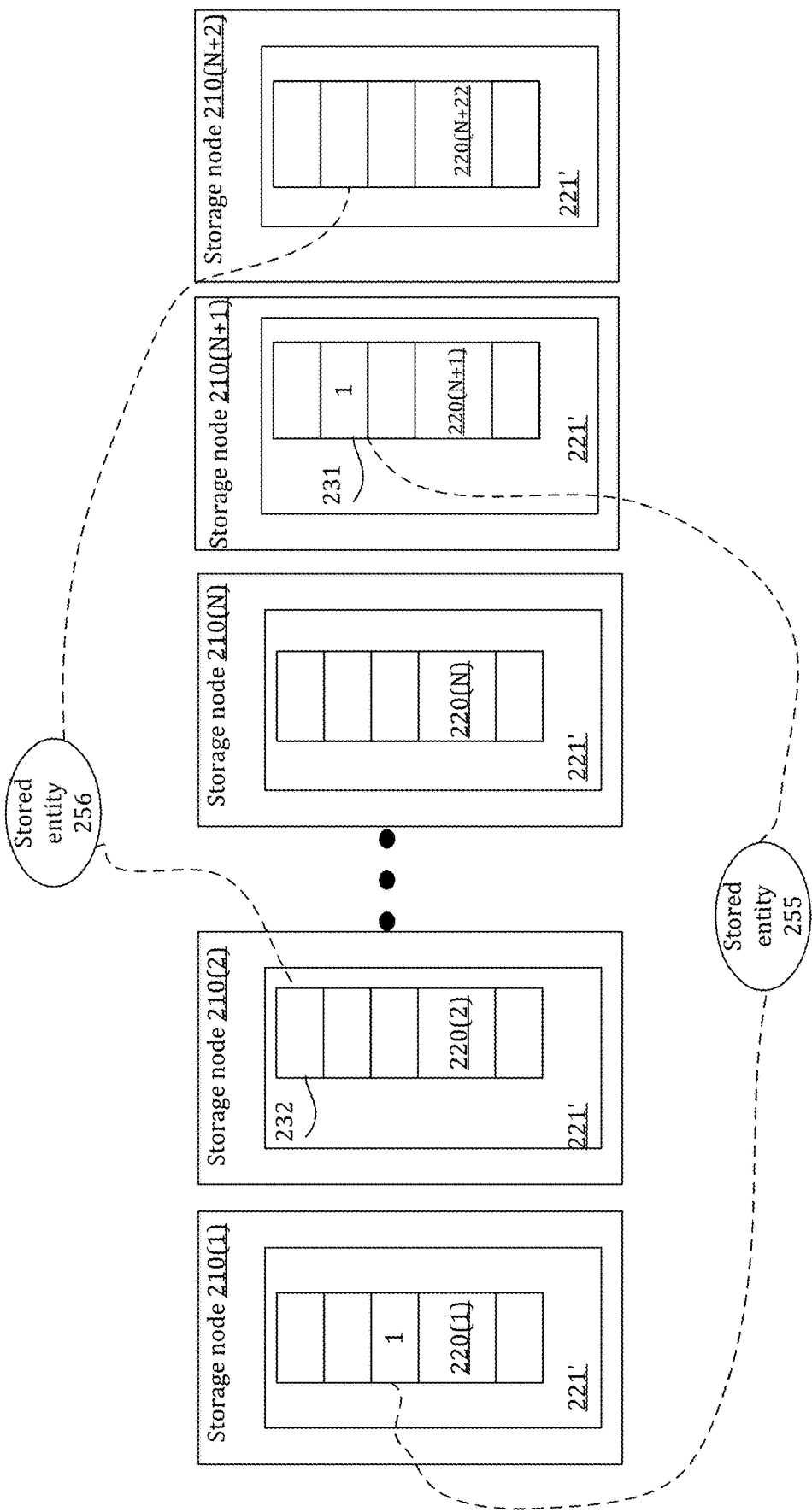
FIG. 2 illustrates an example of storage nodes of a storage system after an expansion process.

FIG. 1 illustrates N storage nodes, 210(1)-210(N), of the storage system before the expansion process, and FIG. 2 illustrates N+2 storage nodes, 210(1)-210(N), 210(N+1), 210(N+2), after the expansion process that includes adding two storage nodes 210(N+1), 210(N+2).

Each storage node includes a memory 221' and may include other storage devices not shown. At least part of memory 221' is dedicated for storing metadata structures, such as lock data structure 220 that is sharded across storage nodes 210(1)-210(N) in FIG. 1. Each lock data structure shard 220(1)-220(N) includes multiple lock entries.

A lock entry 221 in storage node 210(1), for example, is associated with and represents the lock state of a first stored entity 255, as illustrated by the dashed line, and lock entry 222 in storage node 210(N) is associated with and represents the lock state of a second stored entity 256, before the expansion process. Stored entities 255 and 256 may be stored in other storage devices that are different from memories 221 (not shown) of the storage system, or in other locations of memories 221.

In this example, during the expansion process, two storage nodes were added, and the total number of storage nodes is now N+2, providing more space for lock metadata structures, as illustrated in FIG. 2.

When applying the address translation function for supporting the added memory, the new lock entry of the first storage entity is now lock entry 231 in storage node 210(N+1), and the new lock entry of the second storage entity is now lock entry 232 in storage node 210(2). Note that the new lock entry is not necessarily in the newly added storage nodes. Storage entities 255 and 256 are illustrated as being associated with two lock entries, which are according to the old and new addressing.

Suppose the first stored entity needs to be locked during the first phase of the expansion process, both the old lock entry and the new lock entry are updated to indicate a locked entity, as indicated by the content '1' of the corresponding lock entries in FIG. 2, associated with the first stored entity.

Figure 3:
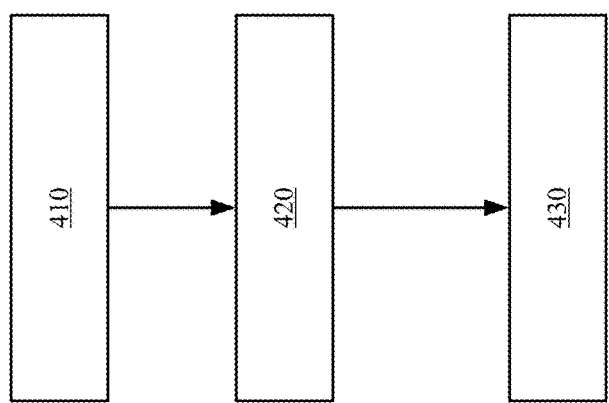
FIG. 3 illustrates an example of a method.

FIG. 3 illustrates method 400 for lock metadata re-balancing upon an expansion of a storage system.

Method 400 may include multiple phases and may start by step 410 of instructing multiple compute entities, by an expansion manager and during a first phase of the lock metadata re-balancing, to acquire locks by using: (a) a current translation function for linking addresses of current lock metadata units (LMUs) to identifiers of stored entities, and (b) a next translation function for linking addresses of new LMUs to identifiers of stored entities.

The current translation function is based (at least in part) on a size of a current storage space allocated to the lock metadata. The current translation function is used for obtaining the current location/address of the LMU so as to allow access to the current LMU.

The new translation function is based (at least in part) on a size of a new storage space allocated to the lock metadata. The current space is expanded during the expansion of the storage system to provide the next storage space. The next translation function is used for obtaining the next location/address of the LMU so as to allow access to the next LMU.

Step 410 may include sending a first instruction to the multiple compute entities; and receiving, by the expansion manager, acknowledgements indicative of a reception of the first instruction by each one of the multiple compute entity.

If only some of the compute entities responded—the transition to step 420 may be delayed. The instruction can be-resent (for example to a non-responding compute entity), the reception of the instructions may be verified in any other manner, and any corrective step that may assist in correcting any lack of acknowledgement may be applied.

In order to prevent deadlocks that may occur when two compute entities try to acquire, simultaneously, two locks related to the same stored entity—the instructing may also include instructing the multiple compute entities to attempt to acquire a lock represented by a current LMU and by a next LMU according to a predefined order—for example—attempt to acquire a lock according to the order of the addresses values, e.g., lower address first, or by using the current translation function first.

Step 410 may be followed by step 420 of instructing the multiple compute entities, by the expansion manager and during a second phase of the lock metadata re-balancing that follows the receiving of the acknowledgements, to: (a) check status of locks by using the current translation function and by using the next translation function; and (b) acquire locks by using the next translation function without using the current translation function.

Step 420 may also include determining a release status of current locks, i.e., whether there are still locks that were acquired according to the current translation function. The determining may include monitoring, by the expansion monitor, a release status of the current LMUs. Additionally or alternatively, the determining of the release status may include receiving, by the expansion monitor, current LMU release indications from at least some of the multiple compute entities, for example, each compute entity may report when all the locks that were acquired by it —are released.

Step 420 may be followed by step 430 of instructing the multiple compute entities, by the expansion manager, and during another phase of the lock metadata re-balancing that follows a release of all current LMUs and reception of acknowledgments from all the compute entities regarding the reception of the instruction of the second phase, to acquire locks and check status of locks using the next translation function without using the current translation function.

The current translation function and the next translation function may be a hash function, may be a modulo function or any other function.

Figure 4:
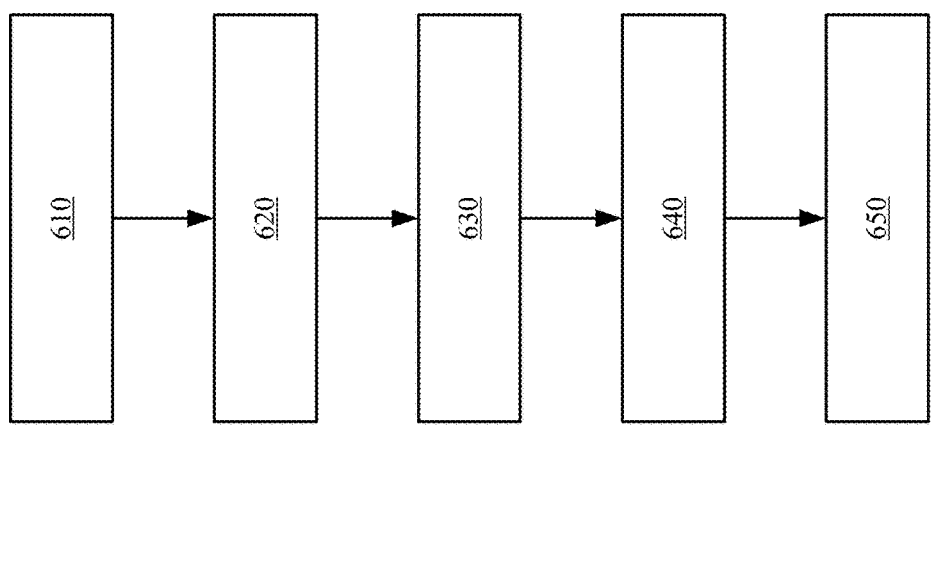
FIG. 4 illustrates an example of a method.

FIG. 4 illustrates an example of method 600.

Method 600 may include multiple phases and may start by step 610 of receiving a first instruction by multiple compute entities, from an expansion manager and during a first phase of the lock metadata re-balancing, to acquire locks by using: (a) a current translation function for linking addresses of current lock metadata units (LMUs) to identifiers of stored entities, and (b) a next translation function for linking addresses of new LMUs to identifiers of stored entities.

The current translation function is based (at least in part) on a size of a current storage space allocated to the lock metadata.

The new translation function is based (at least in part) on a size of a new storage space allocated to the lock metadata. The current space is expanded during the expansion of the storage system to provide the next storage space.

Step 610 may be followed by step 620 of acquiring locks according to the first instruction by the multiple compute entities.

Step 620 may also include sending to the expansion manager, acknowledgements indicative of a reception of the first instruction by each one of the multiple compute entity.

Step 620 may be followed by step 630 of receiving by the multiple compute entities during a second phase of the lock metadata re-balancing (that follows the receiving of the acknowledgements), a second instruction for (a) checking status of locks by using the current translation function and by using the next translation function; and (b) acquiring locks by using the next translation function without using the current translation function.

Step 630 may be followed by step 640 of checking status and acquiring locks (by the multiple compute entities) according to the second instruction.

Step 640 may also include reporting to the expansion monitor, current LMU release indications from at least some of the multiple compute entities.

Step 640 may be followed by step 650 of receiving by the multiple compute entities from the expansion manager and during a third phase of the lock metadata re-balancing that follows a release of all current LMUs, to acquire locks and check status of locks using the next translation function without using the current translation function.

Step 660 may be followed by acquiring locks and checking status of locks (by the multiple compute entities) using the next translation function without using the current translation function Locking metadata is short-lived metadata and need not be relocated in order to balance the lock metadata across the new and old storage space. Other metadata types may be long lived metadata that requires relocation according to the new addresses to achieve balancing after adding new storage space. Note that the relocation is not necessarily to a newly added storage space, but rather from the old-mapped entry to the new mapped entry.

The metadata of the storage system may further include mapping metadata that maps a stored entity identifier (e.g., a file handle) to other metadata structures such as file attributes and mapping logical addresses (e.g., an offset within a file) into physical locations within the various storage nodes and storage devices.

An example of such metadata may include mapping hash tables that maps a stored entity identifier (e.g., logical address, a file identifier, an object identifier) into the various attributes of the stored entity. For example, the stored entity may be a file, and the file handle may be used as a key to one or more hash tables that further points to the file metadata and the file block mapping.

The hash function may be based on the value of the stored entity identifier (e.g., a handle) and the size of the address space, e.g., the number of storage nodes, the number of storage devices and sections within the storage devices allocated to the mapping metadata (e.g., hash tables).

Since the hash function depends on the size of the metadata storage space, the hash result that dictates the location in the storage space also depends on the size of the storage space, and the expansion of the storage space causes changes in the locations of the entries of the hash table.

It is assumed that an update of an entry in the mapping metadata is relatively time consuming that may involve traversing a tree data structure of address ranges, multiple lookups, multiple updates, etc. Therefore, it is not favorable to update both the entry according to the old addressing scheme and the new addressing scheme, as part of a foreground operation, i.e., as part of responding to a client's write request.

An entry in a mapping metadata may include a bucket that may include information for multiple stored entities, where the information includes at least identification of the stored entities assigned to the bucket.

At the first phase of balancing of the mapping metadata, a first instruction is sent to all the compute entities to lookup entries of the mapping data structure, when needed, according both old and new address schemes. At this phase, updating the mapping data structure, e.g., inserting new file information in the hash tables or updating stored metadata, is done only according to the old space scheme.

Informing the compute entities about needing to lookup both old and new address schemes, while updates are done only according to the old address scheme, is required because there may be multitude compute entities needed to be informed and the first phase may take some time (e.g., few second, few minutes or more). If the first instruction would have instructed to update only according to the new address scheme, compute nodes that did not yet received the first instruction to lookup both locations, would miss information that was updated in the new location by compute nodes that already received the first instruction. As mentioned earlier, updating both locations is not favorable so as not to degrade the latency of incoming write requests.

At a second phase, after all the compute entities acknowledged, a second instruction is sent for updating entries of the mapping data structure, when needed, only according to the new address scheme. Lookups are done according to both the old and new schemes.

During the second phase, relocation is performed in the background to relocate all the entries (that were not updated by foreground processes related to received write requests) according to the new space scheme. The relocation may be performed by the compute entities and managed by the expansion manager.

At a third phase, a third instruction is sent for instructing that all accesses to the mapping metadata, including lookups, are done only according to the new space scheme.

Figure 5:
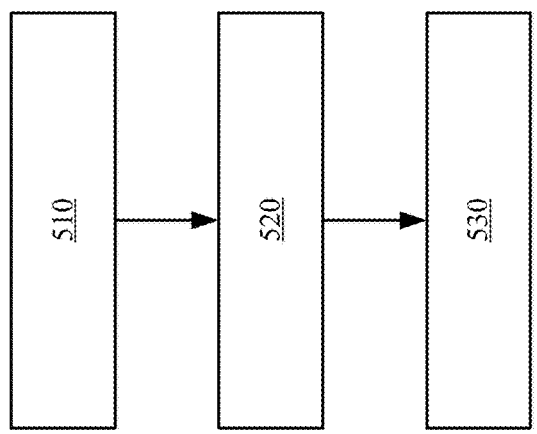
FIG. 5 illustrates an example of a method.

FIG. 5 illustrates an example of method 500 for stored entity metadata re-balancing upon an expansion of a storage system.

Method 500 may include multiple phases.

Method 500 may start by step 510 of instructing multiple compute entities, by an expansion manager and during a first phase of the stored entity metadata re-balancing, to:
  a. Lookup any stored entity metadata by using a current translation function for linking identifiers of stored entities to stored entities metadata; wherein the current translation function is based on a size of a current storage space allocated to stored entities metadata.
  b. Lookup any stored entity metadata by using a next translation function for linking identifiers of stored entities to stored entities metadata; wherein the next translation function is based on a size of a next storage space allocated to stored entities metadata; wherein the current space is expanded during the expansion of the storage system to provide the next storage space.
  c. Update any stored entity metadata accessed using the current translation function without updating stored entity metadata accessed using the next translation function.

A look-up of any stored entity metadata means that once there is a need to access the stored entity metadata (for example when receiving an access request) then the stored entity metadata is looked up.

Step 510 may include receiving, by the expansion manager, acknowledgements indicative of a reception of an instruction sent during the first phase by each one of the multiple compute entities, and determining whether to move to step 520—following the receiving of the acknowledgements.

If only some of the compute entities responded—the transition to step 520 may be delayed. The instruction can be-resent (for example to a non-responding compute entity), the reception of the instructions may be verified in any other manner, and any corrective step that may assist in correcting any lack of acknowledgement may be applied.

Step 510 may be followed by step 520 of instructing the multiple compute entities, by the expansion manager and during a second phase of the stored entities metadata re-balancing to:
  a. Update, any stored entity metadata accessed using the next translation function without updating stored entity metadata accessed using the current translation function.
  b. Lookup any stored entity metadata by using the next translation function and by using the current translation function.

Step 520 may also include reallocating stored entity metadata entries not accessed during the second phase from locations set by the current translation function to locations set by the next translation function. The reallocating may be executed as a background process.

Step 520 may be followed by step 530 of instructing the multiple compute entities to look up any stored entity metadata by using the next translation function and not by the current translation function, during a third phase that follows a completion of the second phase.

Figure 6:
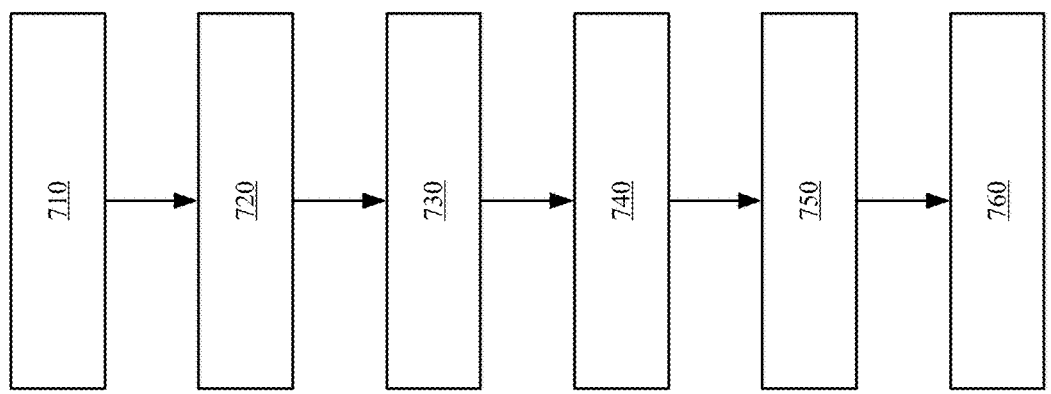
FIG. 6 illustrates an example of a method.

FIG. 6 illustrates method 700.

Method 700 may start by step 710 of receiving by multiple compute entities, from an expansion manager and during a first phase of the stored entity metadata re-balancing, a first instruction to:
  a. Lookup any stored entity metadata by using a current translation function for linking identifiers of stored entities to stored entities metadata; wherein the current translation function is based on a size of a current storage space allocated to stored entities metadata.
  b. Lookup any stored entity metadata by using a next translation function for linking identifiers of stored entities to stored entities metadata; wherein the next translation function is based on a size of a next storage space allocated to stored entities metadata; wherein the current space is expanded during the expansion of the storage system to provide the next storage space.
  c. Update any stored entity metadata accessed using the current translation function without updating stored entity metadata accessed using the next translation function.

A look-up of any stored entity metadata means that once there is a need to access the stored entity metadata (for example when receiving an access request) then the stored entity metadata is looked up.

Step 710 may be followed by step 720 of looking up any stored entity metadata and updating any stored entity metadata, by the multiple compute entities, according to the first instruction.

Step 720 may also include sending to the expansion manager, acknowledgements indicative of a reception of an instruction sent during the first phase by each one of the multiple compute entity.

Step 720 may be followed by step 730 of receiving by the multiple compute entities, from the expansion manager and during a second phase of the stored entities metadata re-balancing instructions to:
  a. Update, any stored entity metadata accessed using the next translation function without updating stored entity metadata accessed using the current translation function.
  b. Lookup any stored entity metadata by using the next translation function and by using the current translation function.

Step 730 may be followed by step 740 of updating stored entity metadata and looking out for any stored entity metadata, by the multiple compute entities, according to the second instruction.

Step 740 may be followed by step 750 of receiving, by the multiple compute entities, a third instruction from the expansion manager, to look up any stored entity metadata by using the next translation function and not by the current translation function, during a third phase that follows a completion of the second phase Step 750 may be followed by step 760 of looking up (by the multiple compute entities) any stored entity metadata and updating (by the multiple compute entities) any stored entity metadata by using the next translation function and not by the current translation function, during a third phase that follows a completion of the second phase.

Figure 7:
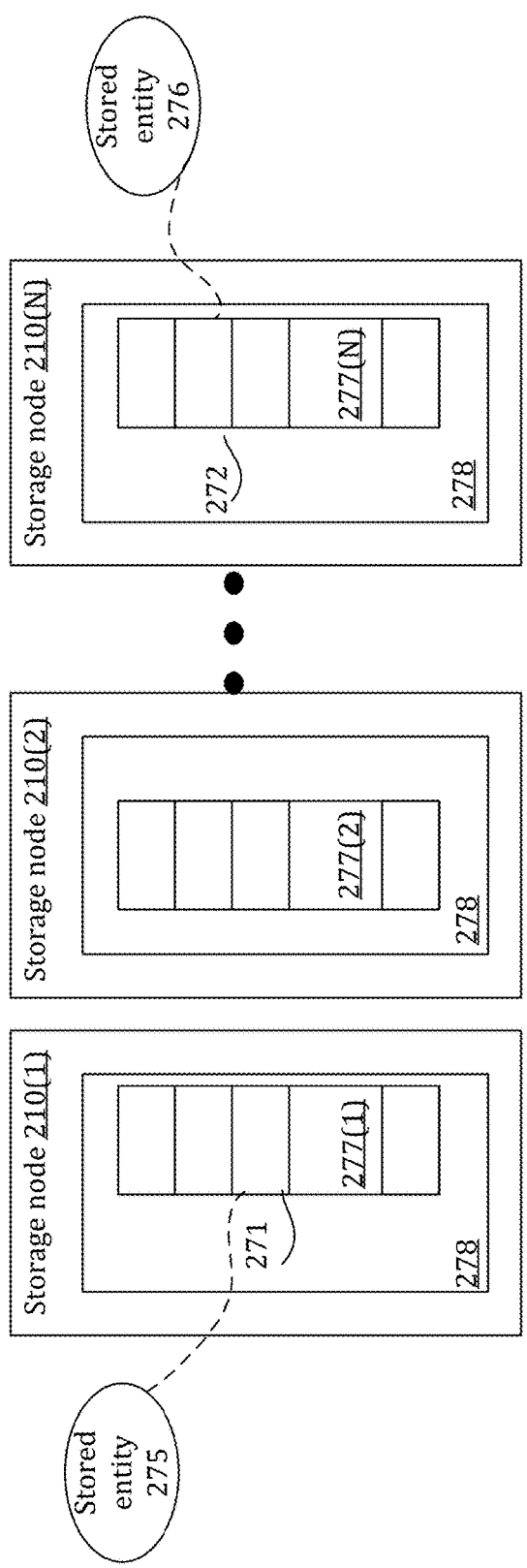
FIG. 7 illustrates an example of storage nodes of a storage system before an expansion process.

FIG. 7 illustrates N storage nodes, 210(1)-210(N), of the storage system before the expansion process, and FIG. 7B illustrates N+2 storage nodes, 210(1)-210(N), 210(N+1), 210(N+2), after the expansion process that includes adding two storage nodes 210(N+1), 210(N+2).

Each storage node includes a memory 278 and may include other storage devices not shown. At least part of memory 278 is dedicated for storing metadata structures, such as data structure 272 that stores stored entities metadata that is sharded across storage nodes 210(1)-210(N) in FIG. 7A. Each data structure shard 272(1)-272(N) includes multiple entries, each store a stored entity metadata.

Stored entity metadata 271 in storage node 210(1), for example, is associated with and stores metadata of a first stored entity 275, as illustrated by the dashed line, and stored entity metadata 272 in storage node 210(N) is associated with and stores metadata of a second stored entity 276, before the expansion process. Stored entities 275 and 276 may be stored in other storage devices (not shown) that are different from memories 278 of the storage system, or in other locations of memories 278.

Figure 8:
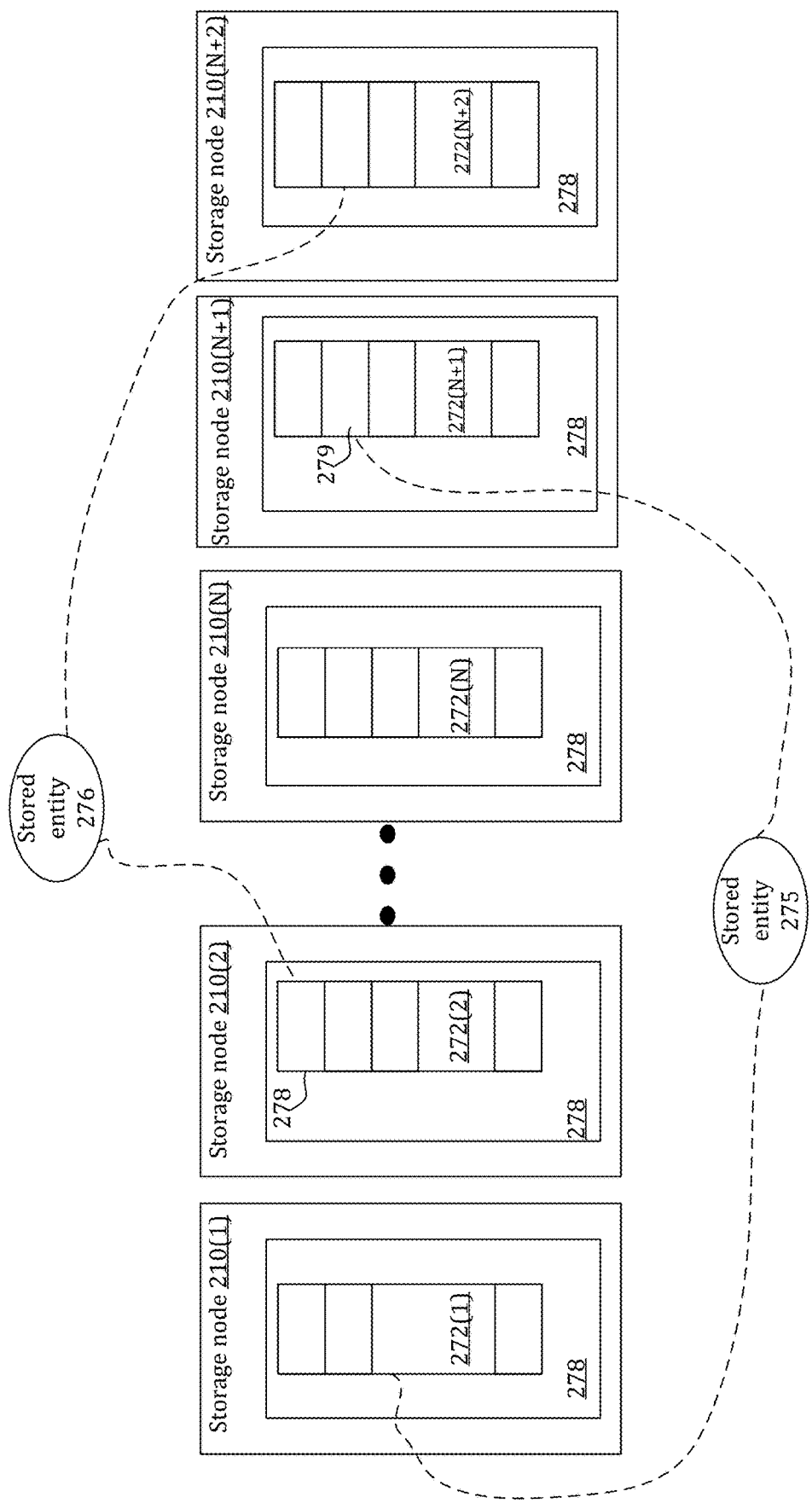
FIG. 8 illustrates an example of storage nodes of a storage system after an expansion process.

In this example, during the expansion process, two storage nodes were added, and the total number of storage nodes is now N+2, providing more space for lock metadata structures, as illustrated in FIG. 8.

When applying the address translation function for supporting the added memory, the new entry of the first storage entity 275 is now entry 279 in storage node 210(N), and the new entry of the second storage entity 276 is now entry 278 in storage node 210(2). Note that the new entry is not necessarily in the newly added storage nodes.

Suppose the first stored entity or the second stored entity needs to be accessed during the expansion process, both the old and new entries may be accessed, as can be understood from FIG. 8 where each stored entity is associated with two entries, as illustrated by the dashed lines.

Figure 9:
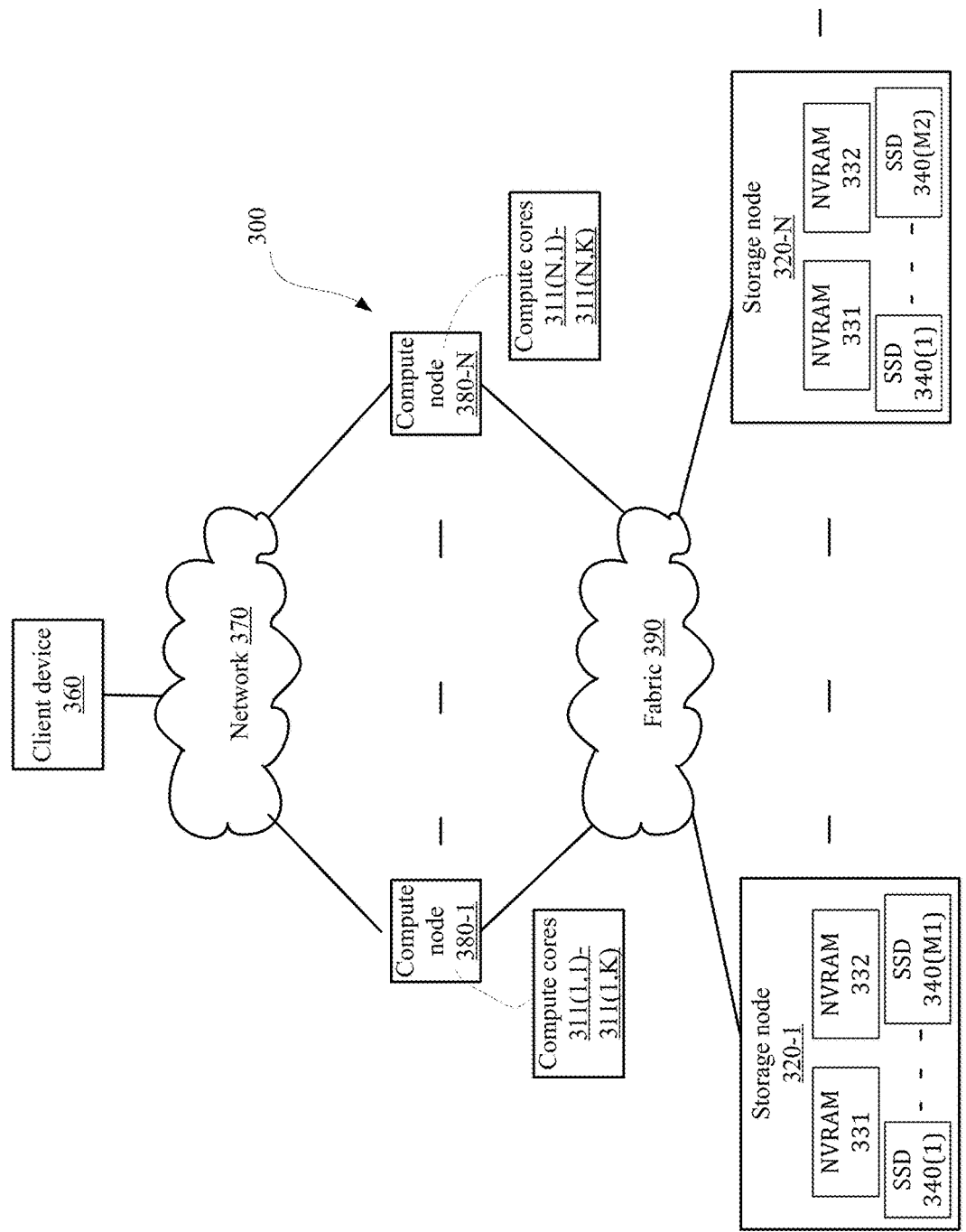
FIG. 9 is an example of a storage system.

FIG. 9 shows an example diagram of a storage system 300 according to the disclosed embodiments.

The storage system 300 includes a number of N compute nodes 380-1 through 380-N (hereinafter referred to individually as a compute node 380 and collectively as compute nodes 380, merely for simplicity purposes, N is an integer equal to or greater than 1). The compute nodes include (or may execute) multiple compute cores each—see for example compute cores 311(1,1)-311(1,K) and compute cores 311(N,1)-311(N,K).

FIG. 9 also illustrates an expansion manager 310. The expansion manager may be a module within one or more compute nodes, for example, FIG. 9 illustrates expansion manager 310 as being included in compute node 380-N. Alternatively, the expansion manager may be a dedicated node that is external to any compute node. There may be more than one expansion manager that share the expansion workload.

The storage system 300 also includes a number of M storage nodes 320-1 through 320-M (hereinafter referred to individually as a storage node 320 and collectively as storage nodes 320, merely for simplicity purposes, M is an integer equal to or greater than 1). The computer nodes 380 and the storage nodes 320 are connected through a communication fabric 390. M may equal N or may differ from N.

In an embodiment, a compute node 380 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 380 does not require any dedicated hardware A compute node 380 is configured to perform tasks related to the management of the storage nodes 320, such as a filesystem tree traversal. In an embodiment, each compute node 380 interfaces with multiple client devices such as a client device 360 (or an application installed therein) via a network 370. To this end, a compute node 380 is configured to receive requests (e.g., read or write requests) and promptly serve these requests in a persistent manner. The network 370 may be, but is not limited to, the Internet, the world-wide-web (WWW), a local area network (LAN), a wide area network (WAN), and the like.

In an embodiment, a compute node 380 is configured to interface with different protocols implemented by the client devices or applications (e.g., TCP/IP, HTTP, FTP, various filesystem protocols, etc.) and to manage the read and write operations to the storage nodes 320. The compute node 380 is further configured to translate the protocol commands into a unified structure (or language). Then, each compute node 380 is also configured to logically address and map all elements stored in the storage nodes 320.

The compute nodes participate in the expansion process and execute the steps of methods 600 and 700. The expansion manager manages the expansion process and executes the steps of methods 400 and 500.

In an embodiment, to efficiently read and write data to the storage nodes 320 from the physical layer, each compute node 380 performs a number of processes including data reduction, data resiliency, and Flash memory management actions (e.g., defrag, wear leveling, and so on).

It should be noted that each compute node 380 may operate in the same manner as all other compute nodes 380. In a case of a failure, any compute node 380 can replace the failed node. Further, each compute node may control and manage one or mode storage nodes 320 regardless of the specific architecture of the storage nodes 320. Therefore, there is no coupling between specific compute nodes 380 and specific storage nodes 320. As such, compute nodes can be added to the system 300 without increasing the number of storage nodes (or their capacity), and vice versa, storage nodes can be added without increasing the number of compute nodes 380.

The storage nodes 320 provide the storage and state in the system 300. To this end, each storage node 320 may include a plurality of SSDs, such as SSDs 340, for example storage node 320-1 includes M1 SSDs 340(1)-340(M1). Each storage node further includes fast accessed memory for storing the traversal task queues, such as NVRAM 331 and 332 of FIG. 3. The traversal task queues may be stored in either a volatile memory or non-volatile memory within the storage node.

The storage nodes 320 may be configured to have the same capacity as each other or different capacities from each other. In an embodiment, the data stored in each storage node 320 is made redundant internally within the storage node, made redundant at a different storage node, or both.

A storage node 320 may be configured to communicate with the compute nodes 380 over the communication fabric 390. It should be noted that each compute node 380 can communicate with each storage node 320 over the communication fabric 390. There may not be a direct coupling between a compute node 380 and storage node 320.

In the embodiment, the communication fabric 390 may include an Ethernet fabric, an InfiniBand fabric, and the like. Specifically, the communication fabric 390 may enable communication protocols such as, but not limited to, remote direct memory access (RDMA) over Converged Ethernet (RoCE), iWARP, Non-Volatile Memory Express (NVMe), and the like. It should be noted that the communication protocols discussed herein are provided merely for example purposes, and that other communication protocols may be equally utilized in accordance with the embodiments disclosed herein without departing from the scope of the disclosure.

It should be noted that in one example deployment, the client device 360 is part of a compute node 380. In such a deployment, the system 300 does not communicate with an external network, e.g., the network 370. It should be further noted that the communication between the compute nodes 380 and the storage nodes 320 is facilitated over the fabric 390. It should be further noted that the compute nodes 320 can communicate with each other over the fabric 390. The fabric 390 is a shared fabric.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for synchronizing multiple compute entities during stored entity metadata re-balancing that is performed upon an expansion of a storage system, the method comprises:
   instructing multiple compute entities, by an expansion manager and during a first phase of the stored entity metadata re-balancing, to:
   (i) lookup any stored entity metadata, during the first phase, in both current and next locations of metadata entries of the stored entity metadata by using:
      a current translation function for linking identifiers of stored entities to stored entities metadata; wherein the current translation function is based on a size value of a current storage space allocated to stored entities metadata; and
      a next translation function for linking identifiers of stored entities to stored entities metadata; wherein the next translation function is based on a size value of a next storage space allocated to stored entities metadata; wherein the current space is expanded during the expansion of the storage system to provide the next storage space; and
   (ii) update any stored entity metadata accessed using the current translation function without updating stored entity metadata accessed using the next translation function;
   accessing a stored entity, by any of the multiple compute entities that receives an access request after being instructed and during the first phase, wherein the accessing comprises: using the current translation function for looking up a current location of a metadata entry of the stored entity, using the next translation function for looking up a next location of the metadata entry, and updating the stored entity metadata at the current location; and
   instructing the multiple compute entities, by the expansion manager and during a second phase of the stored entities metadata re-balancing to:
   update, any stored entity metadata accessed using the next translation function without updating stored entity metadata accessed using the current translation function;
   lookup any stored entity metadata by using the next translation function and by using the current translation function.

2. The method according to claim 1, comprising receiving, by the expansion manager, acknowledgements indicative of a reception of an instruction sent during the first phase by each one of the multiple compute entities.

3. The method according to claim 2, wherein the second phase follows the receiving of the acknowledgements.

4. The method according to claim 1, wherein the second phase comprises reallocating stored entity metadata entries not accessed during the second phase from locations set by the current translation function to locations set by the next translation function.

5. The method according to claim 4 wherein the reallocating is executed as a background process.

6. The method according to claim 1 comprising looking up any stored entity metadata by using the next translation function and not by the current translation function, during a third phase that follows a completion of the second phase.

7. A non-transitory computer readable medium for synchronizing multiple compute entities during stored entity metadata re-balancing that is performed upon an expansion of a storage system, the non-transitory computer readable medium stores instructions for:
   instructing multiple compute entities, by an expansion manager and during a first phase of the stored entity metadata re-balancing, to:
   lookup any stored entity metadata, during the first phase, in both current and next locations of metadata entries of the stored entity metadata by using:
      a current translation function for linking identifiers of stored entities to stored entities metadata; wherein the current translation function is based on a size value of a current storage space allocated to stored entities metadata; and
      a next translation function for linking identifiers of stored entities to stored entities metadata; wherein the next translation function is based on a size value of a next storage space allocated to stored entities metadata; wherein the current space is expanded during the expansion of the storage system to provide the next storage space; and
   update any stored entity metadata accessed using the current translation function without updating stored entity metadata accessed using the next translation function;
   accessing a stored entity, by any of the multiple compute entities that receives an access request after being instructed and during the first phase, wherein the accessing comprises: using the current translation function for looking up a current location of a metadata entry of the stored entity, using the next translation function for looking up a next location of the metadata entry, and updating the stored entity metadata at the current location; and
   instructing the multiple compute entities, by the expansion manager and during a second phase of the stored entities metadata re-balancing to:
      update, any stored entity metadata accessed using the next translation function without updating stored entity metadata accessed using the current translation function;
      lookup any stored entity metadata by using the next translation function and by using the current translation function.

8. The non-transitory computer readable medium according to claim 7, that stores instructions for receiving, by the expansion manager, acknowledgements indicative of a reception of an instruction sent during the first phase by each one of the multiple compute entities.

9. The non-transitory computer readable medium according to claim 8, wherein the second phase follows the receiving of the acknowledgements.

10. The non-transitory computer readable medium according to claim 7, wherein the second phase comprises reallocating stored entity metadata entries not accessed during the second phase from locations set by the current translation function to locations set by the next translation function.

11. The non-transitory computer readable medium according to claim 10 wherein the reallocating is executed as a background process.

12. The non-transitory computer readable medium according to claim 7 that looking up any stored entity metadata by using the next translation function and not by the current translation function, during a third phase that follows a completion of the second phase.

13. A storage system comprising:
   an expansion manager that is configured to synchronize multiple compute entities during stored entity metadata re-balancing that is performed upon an expansion of the storage system, and to instruct upon a first phase of the stored entity metadata re-balancing, to:
   lookup any stored entity metadata in both current and next locations of metadata entries of the stored entity metadata by using:
      a current translation function for linking identifiers of stored entities to stored entities metadata; wherein the current translation function is based on a size value of a current storage space allocated to stored entities metadata; and
      a next translation function for linking identifiers of stored entities to stored entities metadata; wherein the next translation function is based on a size value of a next storage space allocated to stored entities metadata; wherein the current space is expanded during the expansion of the storage system to provide the next storage space; and
   update any stored entity metadata accessed using the current translation function without updating stored entity metadata accessed using the next translation function; and
   instruct the multiple compute entities during a second phase of the stored entities metadata re-balancing to:
      update, any stored entity metadata accessed using the next translation function without updating stored entity metadata accessed using the current translation function;
      lookup any stored entity metadata by using the next translation function and by using the current translation function;
   wherein the storage system further comprising the multiple compute entities that are configured to:
   access a stored entity, by any of the multiple compute entities that receives an access request after being instructed and during the first phase, wherein the access comprises: using the current translation function for looking up a current location of a metadata entry of the stored entity, using the next translation function for looking up a next location of the metadata entry, and updating the stored entity metadata at the current location.

14. The storage system according to claim 13 wherein the expansion manager is configured to receive acknowledgements indicative of a reception of an instruction sent during the first phase by each one of the multiple compute entities.

15. The storage system according to claim 14, wherein the second phase follows the receiving of the acknowledgements.

16. The storage system according to claim 13 wherein the storage system is configured to allocate, during the second phase, stored entity metadata entries not accessed during the second phase from locations set by the current translation function to locations set by the next translation function.

17. The storage system according to claim 16 wherein the reallocating is executed as a background process.

18. The storage system according to claim 13 wherein the multiple compute entities are configured to look up any stored entity metadata by using the next translation function and not by the current translation function, during a third phase that follows a completion of the second phase.

\* \* \* \* \*